(No Model.)
J. FINSTERER.
CHAMBER OR COMMODE POT.
No. 470,887. Patented Mar. 15, 1892.
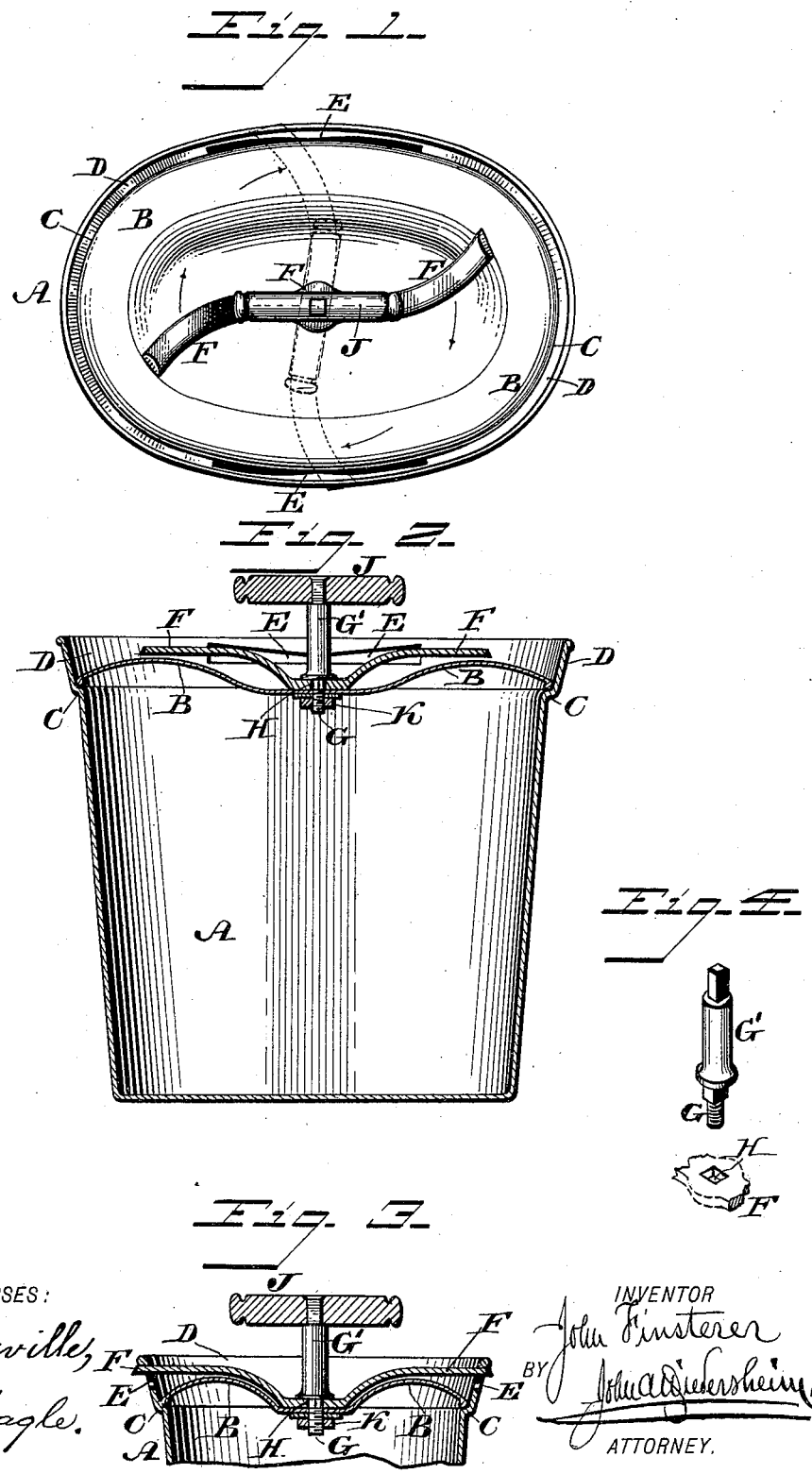

UNITED STATES PATENT OFFICE.

JOHN FINSTERER, OF PHILADELPHIA, PENNSYLVANIA.

CHAMBER OR COMMODE POT.

SPECIFICATION forming part of Letters Patent No. 470,887, dated March 15, 1892.

Application filed November 9, 1891. Serial No. 411,254. (No model.)

*To all whom it may concern:*

Be it known that I, JOHN FINSTERER, a citizen of the United States, residing in the city and county of Philadelphia, State of Pennsylvania, have invented a new and useful Improvement in Chamber or Commode Pots, which improvement is fully set forth in the following specification and accompanying drawings.

My invention consists of a chamber or commode pot whose lid is provided with means for firmly connecting the same with the pot and tightly closing the joint between the parts.

It also consists in providing the lid with a handle which is adapted to operate the locking device of the same.

Figure 1 represents a top or plan view of a chamber or commode pot embodying my invention. Fig. 2 represents a longitudinal vertical section thereof. Fig. 3 represents a transverse vertical section thereof; and Fig. 4 represents a perspective view of the spindle, which is mounted on the lid and carries the operating-handle.

Similar letters of reference indicate corresponding parts in the several figures.

Referring to the drawings, A designates a chamber or commode pot, and B the lid thereof, the latter being seated on the shoulder C on the inner face of the pot below the rim D thereof. In said rim, at the opposite sides thereof, are slots E, each of which is doubly tapering, having its upper wall inclined to the plane of the lid, the parts of said slots joining each other at the narrow ends.

F designates an arm, which is located at the top of the lid B and connected therewith by a screw G, a portion of which is angular, entering an angular opening H in said arm. Attached to the shank G' of the screw is a handle J, whereby said arm may be readily rotated. The screw G passes freely through the lid and is connected therewith by a nut K on the under side thereof; but it is evident that in lieu of said screw I may employ a pin which may be riveted to the lid without, however, affecting the rotation of the arm. The arm is of such length that when it is rotated its ends may enter the slots E, as will be hereinafter set forth. The lid is sunken and the arm correspondingly shaped or depressed, whereby said arm and its handle are set low, so that when the pot is placed in a commode the cover of the latter may be fully closed without being obstructed by said handle or arm or both.

The operation is as follows: The lid is placed on the pot and the arm rotated, whereby its ends enter the wide parts of the slots. As the arm is further rotated its ends gradually wedge or tighten against the walls of the slots, owing to the tapering form of the same, whereby the lid is connected with the pot and firmly pressed on its seat, providing a tight joint between the parts. When the arm is rotated in reverse direction, the ends thereof move out of the slots and clear the rim, whereby the lid is released and made removable. Owing to the double tapering form of the slots E, the ends of the arm may enter either of the wide ends of the slots in order to engage with the rim of the pot.

Having thus described my invention, what I claim as new, and desire to secure by Letters Patent, is—

A commode provided with a shoulder on the inner face of its body below the rim and the latter having on opposite sides slots with inclined walls, a lid adapted to be seated on said shoulder and provided with a rotatable handle having a rotary shank, and an arm connected with said shank with its ends adapted to enter said slots, said parts being combined substantially as described.

JOHN FINSTERER.

Witnesses:
JOHN A. WIEDERSHEIM,
A. P. JENNINGS.